US012521828B2

(12) United States Patent
Vuadens et al.

(10) Patent No.: US 12,521,828 B2
(45) Date of Patent: Jan. 13, 2026

(54) MACHINE TOOL WITH PROTECTIVE BELLOWS

(71) Applicant: CHIRON Group SE, Tuttlingen (DE)

(72) Inventors: Samuel Vuadens, Finhaut (CH); Pierre Fournier, Nax (CH); Blaise Mettan, Evionnaz (CH); Dylan Maret, Martigny (CH)

(73) Assignee: CHIRON Group SE, Tuttlingen (DE)

( * ) Notice: Subject to any disclaimer, the term of this patent is extended or adjusted under 35 U.S.C. 154(b) by 0 days.

(21) Appl. No.: 18/921,454

(22) Filed: Oct. 21, 2024

(65) Prior Publication Data

US 2025/0041981 A1    Feb. 6, 2025

Related U.S. Application Data

(63) Continuation of application No. PCT/EP2023/060339, filed on Apr. 20, 2023.

(30) Foreign Application Priority Data

Apr. 22, 2022  (DE) ................ 10 2022 109 735.8

(51) Int. Cl.
   *B23Q 11/08*    (2006.01)
(52) U.S. Cl.
   CPC ........ *B23Q 11/0816* (2013.01); *B23Q 11/085* (2013.01)
(58) Field of Classification Search
   CPC ................. B23Q 11/0816; B23Q 11/085
   See application file for complete search history.

(56) References Cited

U.S. PATENT DOCUMENTS 3,824,890 A * 7/1974 Zettler .................... F16C 29/08
                                                    409/134
5,364,210 A * 11/1994 Rutschle ................. B23Q 1/66
                                                    29/DIG. 56
(Continued)

FOREIGN PATENT DOCUMENTS

CN    105832436 A    8/2016
DE    1627069 A1     5/1970
(Continued)

OTHER PUBLICATIONS

International Search Report for International Application No. PCT/EP2023/060339, mailed Jul. 4, 2023.
(Continued)

*Primary Examiner* — Daniel D Yabut
(74) *Attorney, Agent, or Firm* — Jason H. Vick; Amped IP LLC (57) ABSTRACT

A machine tool has a frame, a tool spindle with a tool holder, a workpiece holder and a protective bellows. The tool spindle and the workpiece holder are movable relative to one another in at least two translatory axes in a working space. The working space is delimited by at least one partition wall, which has at least one travel opening and, adjacent to the travel opening, a mounting collar, which surrounds the travel opening at least partially. At least the tool spindle or the workpiece holder is coupled to the frame through the travel opening. The protective bellows has a mounting edge adapted to the mounting collar, which is provided with a tension member. The protective bellows is mountable on the mounting collar in a relaxed state of the tension member and is secured to the mounting collar in a tensioned state of the tension member when in a mounted state.

24 Claims, 6 Drawing Sheets

(56) References Cited

U.S. PATENT DOCUMENTS

| | | | |
|---|---|---|---|
| 5,607,269 A | 3/1997 | Dowd et al. | |
| 5,624,363 A * | 4/1997 | Kuriki | B23Q 11/085 |
| | | | 29/DIG. 56 |
| 5,702,403 A | 12/1997 | Heintke et al. | |
| 6,102,633 A * | 8/2000 | Uehlein-Proctor | B23Q 5/34 |
| | | | 408/136 |
| 6,161,992 A | 12/2000 | Holy et al. | |
| 2013/0220092 A1 | 8/2013 | Keenan | |
| 2019/0337061 A1 | 11/2019 | Huber et al. | |

FOREIGN PATENT DOCUMENTS

| | | | |
|---|---|---|---|
| DE | 7812581 U1 | 10/1978 | |
| DE | 3936649 A1 | 5/1991 | |
| DE | 3936640 A1 | 6/1991 | |
| DE | 4309406 A1 | 9/1994 | |
| DE | 4309719 A1 * | 9/1994 | ......... B23Q 11/0816 |
| DE | 19947268 C1 | 10/2000 | |
| DE | 102016117417 A1 | 3/2018 | |
| EP | 0978349 A2 | 2/2000 | |
| GB | 919144 A | 2/1963 | |
| KR | 2012072008 A * | 7/2012 | |
| WO | WO 2018/130538 A1 | 7/2018 | |

OTHER PUBLICATIONS

Written Opinion for International Application No. PCT/EP2023/060339, mailed Jul. 4, 2023.

International Preliminary Report on Patentability for International Application No. PCT/EP2023/060339, mailed Oct. 31, 2024.

Office Action for corresponding German Patent Application No. 102022109735.8 mailed Nov. 17, 2022.

* cited by examiner

MACHINE TOOL WITH PROTECTIVE BELLOWS

CROSS-REFERENCE TO RELATED APPLICATIONS

This application is a continuation of international patent application PCT/EP2023/060339, filed on Apr. 20, 2023 and designating the U.S., which international patent application has been published in German language and claims priority to national German patent application 10 2022 109 735.8, filed on Apr. 22, 2022. The entire contents of these priority applications are incorporated herein by reference.

BACKGROUND

The present disclosure relates generally to machine tools for machining, e.g., for precision machining. In certain embodiments, the present disclosure relates to designs of protective covers for separating/shielding a working space of a machine tool. In exemplary embodiments, the present disclosure relates to machine tools of compact design with a small working space. Such machine tools are used, for example, for manufacturing parts in the watch industry, jewelry industry and/or medical device industry. Other applications are conceivable.

DE 43 09 719 A1 discloses a device for disposing of dust during the manufacture of electrodes for spark erosion. DE 199 47 268 C1, DE 78 12 581 U1 and DE 39 36 640 A1 disclose fastening systems for bellows that can be used in vehicles or household appliances. U.S. Pat. No. 5,607,269 A discloses a bone milling machine that has a tool spindle with a milling tool, wherein the tool spindle extends through a sleeve which serves as a cover.

U.S. Pat. No. 6,161,992 A discloses a machine tool with specific machine kinematics and a movable cover for its movable work head. US 2019/0337061 A1 discloses a dental processing machine with a membrane made of a highly elastic material through which a movable workpiece arm extends. A dental processing machine with a work spindle extending through an elastic membrane is known from CN 105832436 A.

DE 16 27 069 A1 discloses a chip protection device, in particular for milling machines, which has the form of a curtain consisting of a chain mesh that hangs vertically and shields the space around the cutting tool on at least one side.

DE 10 2016 117 417 A1 discloses a cover for a machine tool that provides a recess in a working space boundary. The cover comprises two pairs of movable protective covers that are oriented at 90° to each other. The recess is arranged between the protective covers. The protective covers are designed as roller blinds or bellows. A spindle projecting through the recess can be moved translationally in two axes in a plane defined by the cover. The spindle automatically moves the protective covers along with its translational movement.

Process fluids are usually used in machining, e.g., cooling lubricants that cool the workpiece and the tool. Chips and other debris are flushed away from the machining area by the cooling lubricant. During machining itself, chips are therefore produced in the working space, and tool abrasion and a not inconsiderable amount of cooling lubricant (possibly mixed with chips, abrasion products and the like) can also be expected.

For this reason, machine tool workspaces are regularly enclosed. On the one hand, this is done against the environment (e.g., access opening for an operator). However, the goal is also to shield components of the machine kinematics, such as guides, drives, motors and the like. Since the machining of workpieces regularly involves a relative movement between the tool and the workpiece, moving machine parts regularly protrude through such covers. This requires solutions such as the cover described in DE 10 2016 117 417 A1.

Such covers are based, for example, on several pairs of bellows, telescopic plates or the like facing each other, which together define a movable opening between them. This opening follows the movement of the moving machine part that projects through the opening. This regularly involves opposing movements of a pair of bellows facing each other. Such a solution requires a certain amount of installation space. Furthermore, the bellows must also be moved by the moving machine parts themselves. This generally leads to disadvantages in terms of dynamics. It has been observed that such covers are not easily implementable for machine tools of compact design.

In view of this, it is an object of the present disclosure to present a machine tool having a protective cover that addresses at least some of the above issues.

It is a further object of the present disclosure to present a protective cover that is suitable for machine tools of compact design.

It is a further object of the present disclosure to present a concept for a protective cover that allows the number of components involved in the cover to be reduced.

It is a further object of the present disclosure to present a protective cover that has only a minimal influence on the dynamics of the machine tool.

It is a further object of the present disclosure to present a protective cover that can contribute to a reduction in the resource consumption of the machine tool.

It is a further object of the present disclosure to present a protective cover that enables effective protection of rear components of the machine kinematics from particles, fluids and other foreign bodies that are generated or present in the working space of the machine tool.

It is a further object of the present disclosure to present a protective cover that is easy to maintain and repair.

It is a further object of the present disclosure to present a protective cover that offers a reasonable service life while maintaining low cost.

SUMMARY

According to a first aspect, these and other objects are achieved by a machine tool for multi-axis machining, comprising:
 a frame,
 a working space,
 a tool spindle with a tool holder arranged in the working space,
 a workpiece holder arranged in the working space,
 a partition wall comprising a travel opening and, adjacent to the travel opening, a mounting collar at least partially surrounding the travel opening, and
 a protective bellows,
 wherein the tool spindle and the workpiece holder are movable relative to one another in at least two translatory axes in the working space,
 wherein the partition wall delimits the working space,
 wherein at least one of the tool spindle and the workpiece holder is connected to the frame through the travel opening, wherein the protective bellows has a mounting edge that is adapted to the mounting collar, wherein the mounting edge is provided with a tension member, and wherein the protective bellows is mountable on the mounting collar in a relaxed state of the tension member and is secured on the mounting collar in a tensioned state of the tension member when in a mounted state.

According to a further aspect, there is presented a machine tool, e.g., a machine tool of compact design, comprising:

a frame, a tool spindle with a tool holder, a workpiece holder, and a protective bellows, wherein the tool spindle and the workpiece holder can be moved relative to each other in at least two translatory axes in a working space, wherein the working space is delimited by at least one partition wall which has at least one travel opening and, adjacent to the travel opening, a mounting collar which surrounds the travel opening at least partially, wherein at least the tool spindle or the workpiece holder is coupled to the frame through the travel opening, wherein the protective bellows has a mounting edge adapted to the mounting collar, which is provided with a tension member, and wherein the protective bellows can be mounted on the mounting collar in a relaxed state of the tension member and is secured to the mounting collar in a tensioned state of the tension member.

In this way, a protective cover is provided that adequately shields the machine kinematics arranged behind the working space from the working space. At the same time, the dynamics of the machine tool are maintained. Machine tool components can protrude through the protective cover and be moved during machining, as the protective bellows can accommodate these movements. The protective cover comprises, for example, the partition wall and the protective bellows, which is attached to the mounting collar of the partition wall. In an exemplary embodiment, the protective bellows is a fabric-based protective bellows. In other words, the protective bellows comprises a fabric or cloth.

The protective bellows can be easily attached to the mounting collar or detached from it if necessary. This makes the protective bellows easy to maintain. The protective bellows can be designed as a low-cost wearing part and can be easily replaced if necessary.

The movement of the protective bellows when moving the tool spindle and/or the workpiece holder requires low forces so that the dynamics of the machine tool do not suffer. This also has a positive effect on energy consumption. Especially in comparison to conventional telescopic plates or bellows solutions, there are significant differences here. This also applies to the installation space required by the protective bellows. The protective bellows is not necessarily dependent on a straight guide plane. This also increases design freedom in this respect.

In an exemplary embodiment, the protective bellows is sufficiently elastic to follow the movement of the tool spindle and/or the workpiece holder. In another exemplary embodiment, the protective bellows is designed similarly to a shift boot of a gear lever, thus allowing any necessary relative movements between the tool spindle and the workpiece holder without significant strain.

Kinematics are provided to generate the relative movement between the tool spindle and the workpiece holder, for example three-axis kinematics, four-axis kinematics or five-axis kinematics. By way of example, the kinematics comprise three translatory axes, which are orthogonal to each other and, if required, one or two swivel axes. The kinematics extend at least partially through the travel opening. Accordingly, the kinematics also extend at least partially through the protective bellows, for instance through suitable openings in the protective bellows. Viewed from the working space, at least the tool holder or a machining tool of the tool spindle held on it or a workpiece carried by the workpiece holder is arranged in front of the protective bellows.

The travel opening in the partition wall provides the necessary clearance for the relative movements between the tool spindle and the workpiece holder. The mounting collar is exemplarily designed as a mounting collar projecting towards the working space.

In an exemplary embodiment, a single protective bellows is provided, although the relative movement between the tool spindle and the workpiece holder comprises at least two translatory axes, in particular three translatory axes. It is therefore not necessary to provide two or more protective bellows in order to enable several axes of movement through the protective bellows. By way of example, the relative movement between the tool spindle and the workpiece holder comprises a movement along an X-axis and a Z-axis that is essentially parallel to the surface of the travel opening in the partition wall. By way of example, the relative movement between the tool spindle and the workpiece holder comprises a movement along a Y-axis, which is essentially perpendicular to the surface of the travel opening in the partition wall.

In exemplary embodiments, the machine tool is a machine tool of compact design with a working volume that is smaller than 250 mm×250 mm×250 mm. In exemplary embodiments, the working volume of the machine tool is smaller than 200 mm×200 mm×200 mm. In exemplary embodiments, the working volume of the machine tool is smaller than 150 mm×150 mm×150 mm. In exemplary embodiments, the working volume of the machine tool is smaller than 100 mm×100 mm×100 mm. In exemplary embodiments, the working volume of the machine tool is smaller than 75 mm×75 mm×75 mm. In exemplary embodiments, the working volume of the machine tool is approximately 50 mm×50 mm×50 mm. These values relate in particular to the possible feeds (travels) along the X, Y and Z axes. The working volume can be cube-shaped. However, cuboidal installation spaces are also conceivable, whose travel paths in X, Y and Z are not uniform.

In an exemplary embodiment, the tool holder is configured to hold a rotationally drivable tool, in particular for milling or drilling, i.e. for machining. The term tool spindle is used to represent a tool holder assembly, at least in exemplary embodiments. The term workpiece holder is used to represent a workpiece holder assembly, at least in exemplary embodiments.

According to an exemplary embodiment, the travel opening of the partition wall has a curved edge. According to another exemplary embodiment, the travel opening defines a three-dimensionally extending opening area. For instance, the travel opening comprises a curved opening area. Also in this context, the protective bellows allow greater design freedom than conventional solutions with bellows. This can be used with machine tools of compact design.

According to a further exemplary embodiment, the protective bellows is a fabric bellows. According to a further exemplary embodiment, the protective bellows comprises a liquid-repellent and sealing impregnation or coating. In this way, the protective bellows can effectively prevent or at least minimize the penetration of cooling lubricant, chips, abrasion and similar substances. In an exemplary embodiment, the protective bellows is designed as an elastic fabric bellows based on a coated fabric made of synthetic fibers.

According to a further exemplary embodiment, the mounting collar has a base which is adjoined, at least partially, by a front leg that is offset from the travel opening and serves as a positive-locking positional lock when the tension member is tensioned. In an exemplary embodiment, the tension member rests on the base of the mounting collar when tensioned. This means that the protective bellows cannot be pulled off the mounting collar beyond the front leg.

In an exemplary embodiment, the base is oriented approximately perpendicular to the opening area, wherein the front leg is oriented approximately perpendicular to the base of the mounting collar or parallel to the opening area. The front leg of the mounting collar is offset from the partition wall towards the working space.

According to a further exemplary embodiment, the protective bellows is also secured to the mounting collar by a clamping profile. In other words, in addition to being secured in position by the tension member, the protective bellows can also be fixed to the mounting collar by a clamping profile. This can help to reduce wear of the protective bellows on the mounting collar due to relative movements between the tool spindle and the workpiece holder.

According to a further exemplary embodiment, the clamping profile is supported on the front leg. According to a further exemplary embodiment, the clamping profile encloses the front leg with two legs. For example, the clamping profile has an approximately U-shaped cross-section with a base and two legs. The legs of the clamping profile can secure the protective bellows to the front leg of the mounting collar in a force-fit and/or form-fit manner. It is conceivable to provide securing elements in the form of barbs and the like on at least one of the legs. However, it is also conceivable to dispense with such securing elements and secure the protective bellows to the mounting collar in a force-fit/friction-fit manner.

The clamping profile with the U-shaped cross-section can clamp the front leg of the mounting collar between its two legs. However, it is also conceivable to design the clamping profile in such a way that its base faces the bottom of the mounting collar, with a first leg resting on the front leg and a second leg on the partition wall. In this way, the clamping profile can also secure the protective bellows to the mounting collar in addition to the tension member. In principle, a combined clamping profile is also conceivable, with a cross-section of two opposing U-profiles that are connected to each other on a common leg. In this way, clamping can take place both at the front leg and between the front leg and the partition wall.

The clamping profile can also be referred to as a position securing profile. In an exemplary embodiment, the clamping profile is similar to an edge protection profile. The clamping profile can press the protective bellows against the front leg of the mounting collar over a large area. It has been observed that this helps to reduce wear on the mounting collar. The clamping profile can minimize shearing movements of the protective bellows in the immediate vicinity of any edges of the mounting collar.

The clamping profile is made of an elastomer, a thermoplastic material and/or a metal material, for example. Composite materials are also conceivable, for example reinforced elastomers or thermoplastic materials, wherein the reinforcement can be provided by fibers or metal materials.

According to a further exemplary embodiment, the tool spindle can be moved in translation directly or indirectly on the frame. According to a further exemplary embodiment, the workpiece holder can be moved in translation directly or indirectly on the frame. In other words, the kinematic chain for the tool spindle or the workpiece holder can protrude through the travel opening and thus also through the protective bellows.

According to a further exemplary embodiment, the protective bellows is ring-shaped or octagonal in shape, with the tension member arranged on the mounting edge of the protective bellows. By way of example, at the mounting edge of the protective bellows, a fold (doubling) is provided, which provides a guide for the tension member. The approximately ring-shaped or octagonal design allows the mounting edge to be provided on the outer circumference. At least one opening is provided in an inner area. For example, two openings are provided, which are assigned to the tool spindle and the workpiece holder.

According to a further exemplary embodiment, the protective bellows has a tool opening for the tool spindle. According to a further exemplary embodiment, the protective bellows has a workpiece opening for the workpiece holder. It is understood that in exemplary embodiments, both the workpiece opening and the tool opening are provided.

According to a further exemplary embodiment, the protective bellows has at least one auxiliary opening. The auxiliary opening is provided, for example, for the passage of sensors (e.g., tool breakage detection), for the passage of a guide aid for the protective bellows, for the passage of a coolant line or for similar purposes. It is understood that protective bellows without an auxiliary opening are also conceivable. In the case of a design with at least one auxiliary opening, it is conceivable that the auxiliary opening is closable.

According to a further exemplary embodiment, the protective bellows has a plurality of fastening openings, in particular adjacent to the tool opening and/or to the workpiece opening, with fastening elements projecting through the fastening openings in order to clamp the protective bellows adjacent to the tool opening and/or to the workpiece opening.

In other words, the protective bellows can also be clamped or otherwise fixed to the tool spindle and the workpiece holder in this way. The fastening elements are, for example, screws or the like. On the side facing the working space, for example, strips with openings are provided that are adapted to the fastening openings of the protective bellows. In this way, the protective bellows can be clamped over a wide area.

According to a further exemplary embodiment, the protective bellows is formed from an elastic fabric. According to a further exemplary embodiment, the protective bellows is formed from a polymer-based fabric. According to a further exemplary embodiment, the fabric is coated on at least one side. According to a further exemplary embodiment, the protective bellows can be coated on its side facing the working space. The coating reduces the adhesion of chips and the like. The coating seals the protective bellows, for example making it sufficiently dust-tight, liquid-tight or gas-tight.

By way of example, the protective bellows consists of a polyamide-based fabric that is coated on at least one side. The fabric can have a low specific mass and high elasticity.

The coating ensures sufficient impermeability. The fabric is sufficiently mechanically stable. The fabric is suitable for technical applications. In certain embodiments, the fabric is highly resistant to chips, abrasion and comparable abrasive substances. In exemplary embodiments, the fabric is highly dust-tight. In an exemplary embodiment, the fabric is additionally sealed in the area of any seams (for example to form the fold at the edge of the assembly), so that foreign substances are also largely prevented from penetrating there.

According to a further exemplary embodiment, the protective bellows is prior to the mounting on the mounting collar an essentially sheet-like structure, wherein the mounting edge surrounds an inner region of the sheet-like structure, and wherein at least one tool opening or a workpiece opening is arranged in the inner region of the sheet-like structure. In exemplary embodiments, the fabric that forms the basis for the protective bellows is sufficiently elastic so that the protective bellows can be adapted to the given shape of the travel opening and any positions of the tool spindle and the workpiece holder.

According to a further exemplary embodiment, a shield is adjacent to the workpiece opening in the working space, which can be moved together with the workpiece holder along at least one translatory axis, wherein the shield is arranged as additional chip protection between the workpiece holder and the protective bellows. In this way, the service life of the protective bellows can be further increased. The shield can also be referred to as a chip shield.

The shield is designed, for example, as a flat shield made of sheet metal, which is oriented parallel to the opening area of the travel opening. In certain embodiments, the shield is assigned to an area of the protective bellows in which increased chip entry is expected during machining. The shield therefore has a specific relative position in relation to the tool holder or the machining tool.

According to another exemplary embodiment, the tension member is a tension band that secures the protective bellows to the mounting collar. The tension member has sufficient tensile strength so that the forces required to secure the protective bellows to the mounting collar can be applied. The tension member can be secured in its tensioned state so that the protective bellows is firmly attached to the mounting collar.

It is to be understood that the previously mentioned features and those mentioned in the following may not only be used in the respectively indicated combination, but also in other combinations or as isolated features without leaving the spirit and scope of the present disclosure.

BRIEF DESCRIPTION OF THE DRAWINGS

Further features and advantages of the present disclosure will be apparent from the following description and explanation of several exemplary embodiments with reference to the drawings, wherein.

EMBODIMENTS

Figure 1:
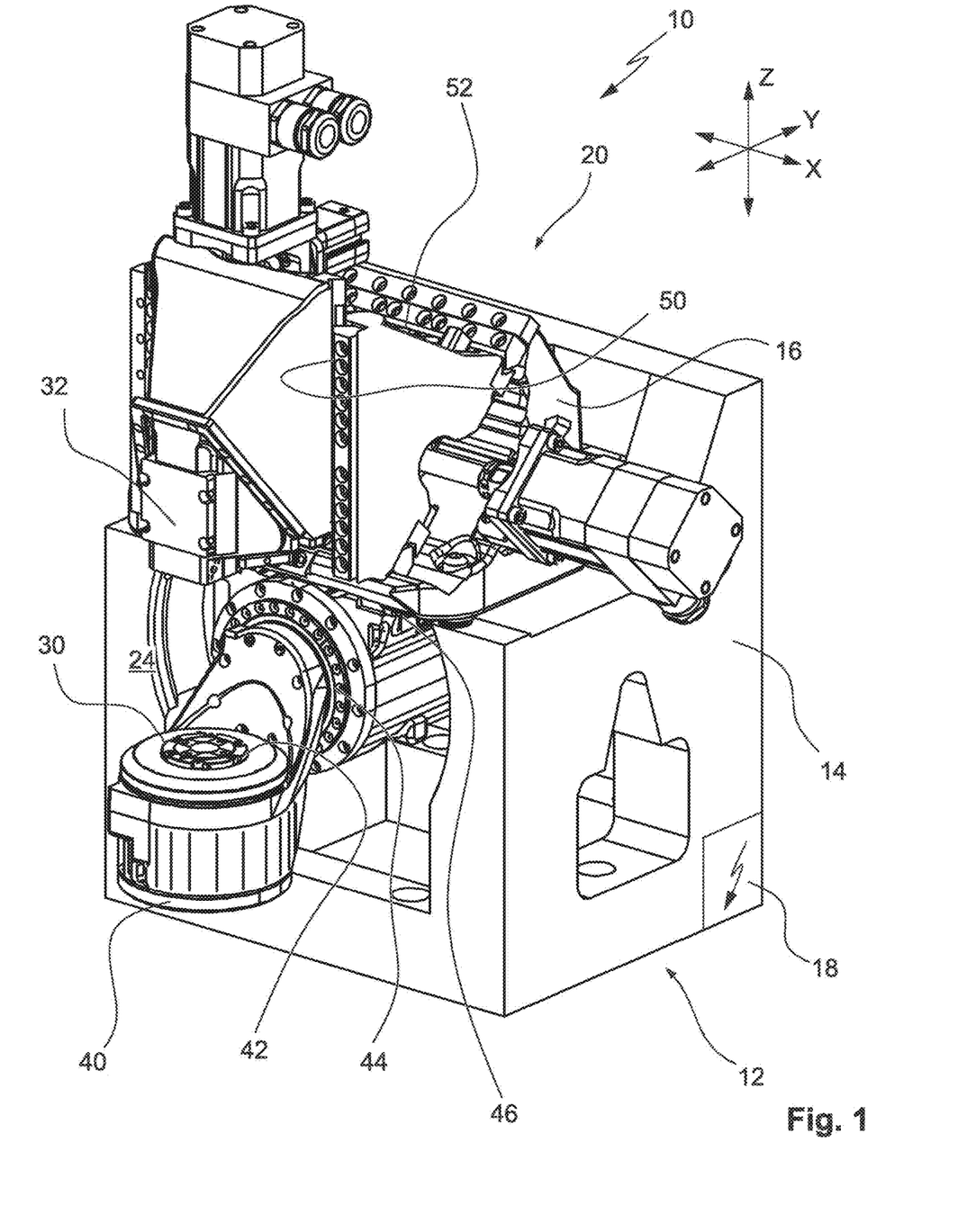
FIG. 1: is a perspective view of a machine tool.

FIG. 1 illustrates an exemplary embodiment of a machine tool 10 of compact design by means of a perspective view, which machine tool 10 is suitable for manufacturing precision mechanical components. The machine tool 10 comprises a frame 12, which in the exemplary embodiment comprises a base frame 14 on which a frame block 16 is mounted. Significant forces that arise during machining are accommodated by the frame block 16. The base frame 14 serves as a support for the frame block 16. In FIG. 1, a control device of the machine tool 10 is also indicated by 18. The control device 18 controls components and functions of the machine tool 10 in order to process workpieces in the desired manner. Control via external devices is also conceivable.

The machine tool 10 also comprises kinematics 20, which is designed as a multi-axis kinematic system. In at least some of the figures, a Cartesian coordinate system X-Y-Z is shown for illustrative purposes. The X-Y-Z coordinate system comprises an X-axis (lateral direction), a Y-axis (depth direction) and a Z-direction (height direction). The X-axis and the Y-axis are horizontal axes in the exemplary embodiment. The Z-axis is a vertical axis in the exemplary embodiment. The X-Y-Z axes are orthogonal to each other. The X-Y-Z coordinate system is primarily used to illustrate and describe components and functions of the machine tool 10. It is understood that other coordinate systems can also be used for these purposes. The X-Y-Z coordinate system is therefore not to be understood to be limiting. The skilled person can easily carry out the necessary intellectual steps to convert to other coordinate systems.

In the exemplary embodiment, the kinematics 20 comprises various components that are mounted directly or indirectly on the frame block 16. This ensures short force paths and high rigidity. In FIG. 1, a working space is also indicated by 24, in which machining takes place with the machine tool 10.

The machine tool 10 further comprises a workpiece holder 30 for holding at least one workpiece to be machined. Furthermore, a tool spindle 32 is provided. It can be seen from the supplementary illustration in FIG. 2 that the tool spindle 32 comprises a tool holder 34, which is configured to accommodate a tool 36. The tool 36 can be rotationally driven in order to machine a workpiece held by the workpiece holder 30.

In the exemplary embodiment, the workpiece holder 30 is supported on a cantilever extension arm 40, which accommodates a swivel drive or rotary drive 42 for the workpiece holder 30. The rotary axis provided in this way can also be referred to as the C-axis. The extension arm 40 is coupled via a further swivel drive 44 to a linear drive 46, which in turn is mounted on the frame block 16. The swivel drive 44 provides a rotational axis, which can be referred to as the B-axis. The linear drive 46 provides a translatory axis, which can be referred to as the Y-axis.

The tool spindle 32 is coupled to the frame block 16 via a linear drive 50 and a linear drive 52. The linear drive 50 provides a translatory axis, which can also be referred to as the Z-axis. The linear drive 52 provides a translatory axis, which can also be referred to as the X-axis. The two linear drives 50, 52 form a cross-slide drive. In the exemplary embodiment, two translatory axes (X, Z) are assigned to the tool spindle 32 or the tool. A translatory axis (Y) is assigned to the workpiece holder 30 or the workpiece. Furthermore, in the exemplary embodiment, two rotational axes/swivel axes (B, C) are assigned to the workpiece holder 30 or the workpiece. Other types of assignment are conceivable and depend on the concept of the machine kinematics.

Overall, the machine tool provides a compact working space 24. This in turn leads to a small size of the machine tool 10, combined with low weight and low energy requirements. At the same time, high precision and a high removal rate can be guaranteed due to the design rigidity.

Figure 2:
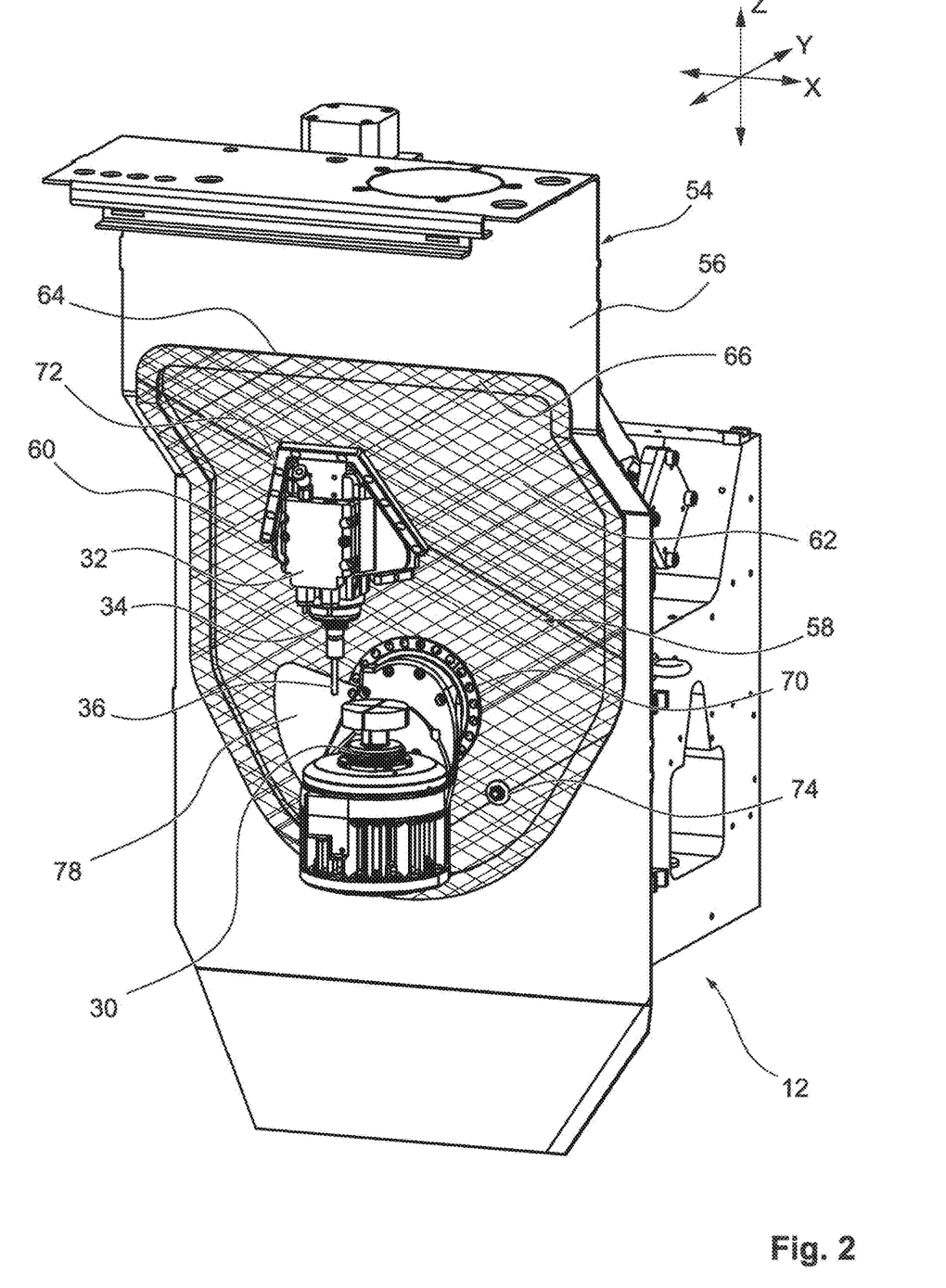
FIG. 2: is a further perspective view of the machine tool as shown in FIG. 1, with a protective cover for the working space being shown.

FIG. 2 illustrates the machine tool 10 using a further perspective view. In FIG. 2, in addition to the illustration in FIG. 1, a protective cover 54 is shown, which delimits the working space 24. The protective cover 54 is arranged between the frame block 16 and the working space 24.

In the exemplary embodiment, the protective cover 54 comprises a partition wall 56 and a protective bellows 58, which is attached to the partition wall 56. The partition wall 56 is made of sheet metal, for example. The partition wall 56 includes a travel opening 62 that defines an opening area 60. Various components of the machine tool 10 protrude through travel opening 62. In the exemplary embodiment according to FIG. 2, the tool spindle 32 is arranged at least partially in the working space 24. Similarly, the workpiece holder 30 is arranged at least partially in the working space 24. The tool spindle 32 is indirectly mounted on the frame block 16. The workpiece holder 30 is indirectly mounted on the frame block 16. Consequently, components of the respective kinematic chain extend through the travel opening 62 and thus through the protective bellows 58.

The protective cover 54 further comprises a mounting collar 64, which surrounds the travel opening 62 at least partially. In the exemplary embodiment according to FIG. 2, the mounting collar 64 completely surrounds the travel opening 62. The mounting collar 64 is placed on an edge 66 of the partition wall 56 surrounding the travel opening 62. It can be seen from FIG. 2 (and FIG. 5) that the partition wall 56 does not run completely flat/planar in the exemplary embodiment. For example, the illustrated partition wall 56 has vertical sections that are offset from one another and are connected to one another via an inclined section. The travel opening 62 and consequently the resulting opening area 60 are also designed accordingly. The protective bellows 58 is seated on the mounting collar 64. The protective bellows 58 is sufficiently elastic so that even a curved travel opening 62 can be closed by the protective bellows 58.

FIG. 2 also indicates that the protective bellows 58 has a workpiece opening 70 for the workpiece holder 30 and a tool opening 72 for the tool spindle 32. Furthermore, by way of example, an auxiliary opening designated by 74 is provided, through which further components can be introduced into the working space 24. It can also be seen from FIGS. 2 and 3 that a shield 78 is associated with the workpiece holder 30, which is arranged as a chip guard between the protective bellows 58 and the working space 24, see also FIG. 5. The shield 78 is located on the linear drive 46 (FIG. 1), for example on a face of the linear drive 46 facing the working space.

The shield 78 is dimensioned and positioned in such a way that at least a partial quantity of the chips produced during machining (mixture of chips, cooling lubricants, abrasion and the like) can be caught before hitting the protective bellows 58. In the exemplary embodiment according to FIGS. 2, 3 and 5, the shield 78 is arranged such that the actual position of the shield 78 does not change when the workpiece holder 30 is pivoted about the B-axis by the pivot drive 44.

Figure 3:
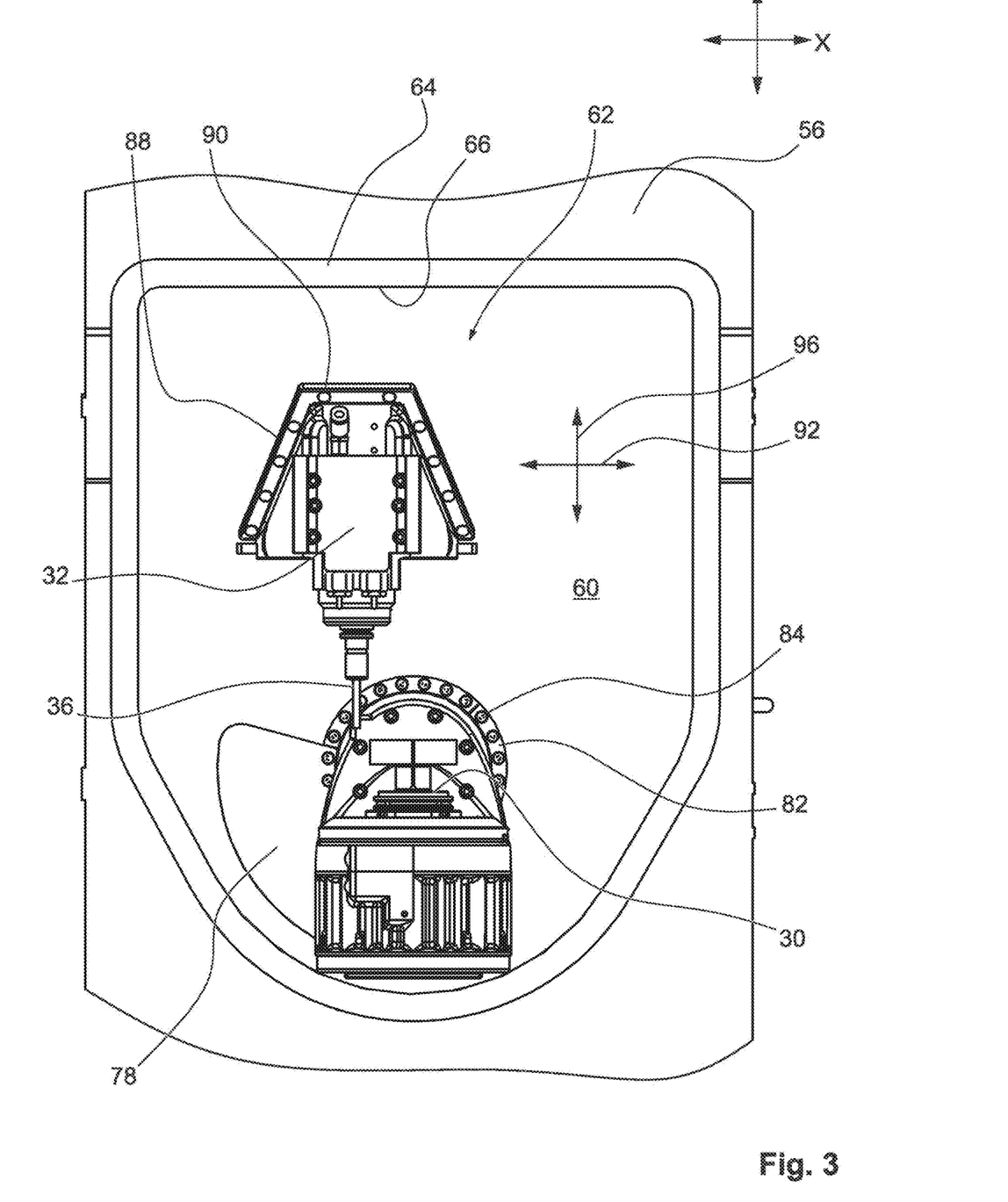
FIG. 3: is a partial frontal view of the machine tool as shown in FIG. 2.
Figure 4:
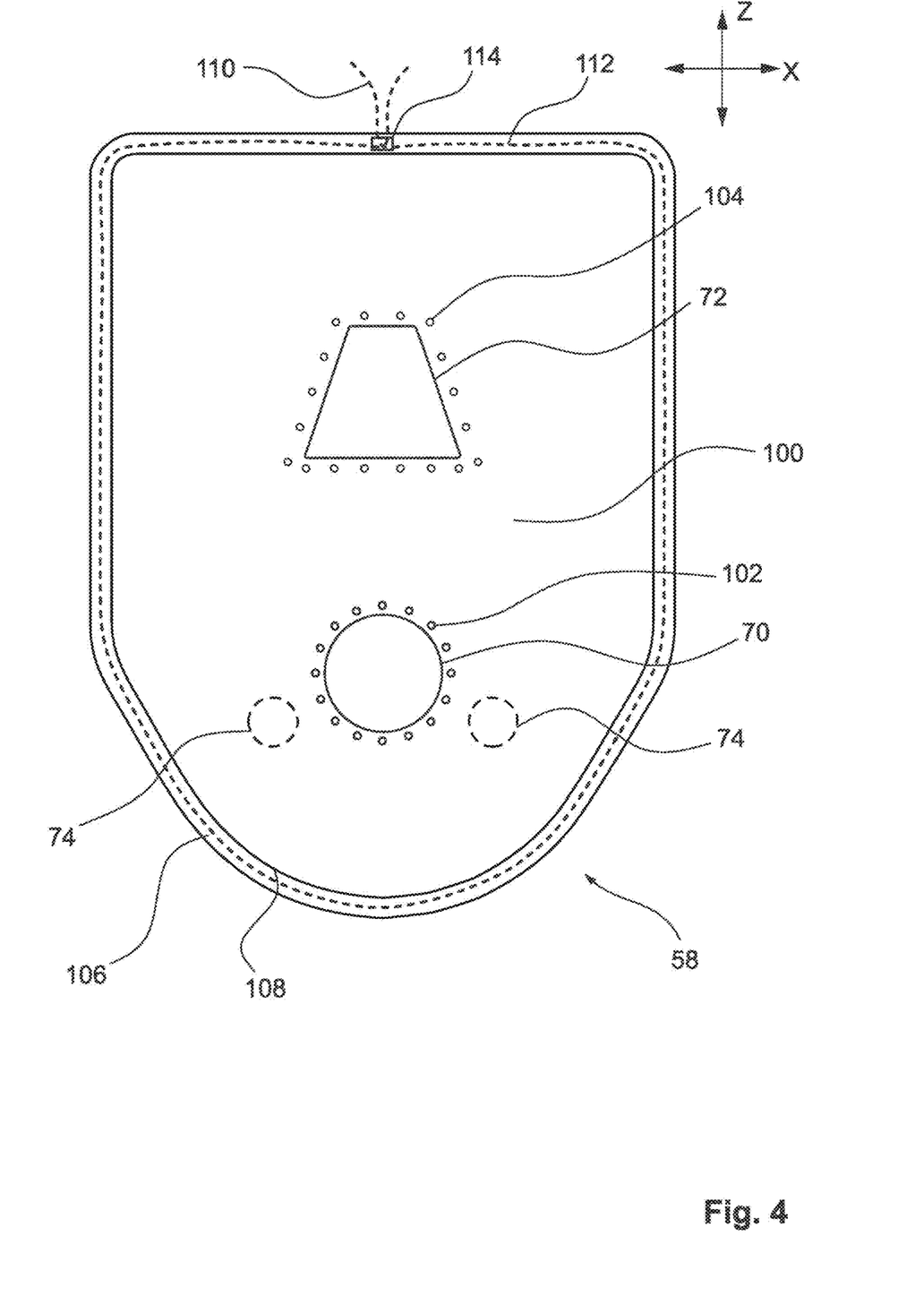
FIG. 4: is a frontal view of a protective bellows for a protective cover of a machine tool.

FIG. 3 shows a frontal view of the travel opening 62, seen from the working space 24. Components of the machine tool 10, which are located behind the travel opening 62 or the opening area 60 defined by the travel opening 62, are not shown in FIG. 3. FIG. 4 illustrates a protective bellows 58, which can be used to cover the travel opening 62, in a non-mounted state. The protective bellows 58 is provided with various openings, compare the workpiece opening 70, the tool opening 72 and two (optional) auxiliary openings 74. The openings 70, 72 and, if required, the openings 74 are arranged in an inner region 100 of the protective bellows 58.

In the mounted state, the workpiece holder 30 projects through the workpiece opening 70. Similarly, the tool spindle 32 projects through the tool opening 72. In the exemplary embodiment, the protective bellows 58 is fixed both at the workpiece opening 70 and at the tool opening 72 to movable components of the machine tool 10 which project through the travel opening 62. At least one clamping segment 82 is associated with the workpiece holder 30, through which fastening elements 84 extend. By way of example, two clamping segments 82 are provided, each covering a ring section of 180°. FIG. 4 shows corresponding fastening openings 102 in the inner area 100, which are distributed around the workpiece opening 70.

At least one clamping segment 88, through which fastening elements 90 extend, is assigned to the tool spindle 32. By way of example, the clamping segment 88 is horseshoe-shaped or U-shaped. It is conceivable to provide a further clamping segment on the open side of the clamping segment 88 (not explicitly designated in FIG. 3). FIG. 4 shows corresponding fastening openings 104, which are distributed around the tool opening 72. The fastening elements 84, 90 are, for example, screws or the like. With the clamping segments 82, 88, the protective bellows 58 can be positively and non-positively fastened to movable components of the machine tool 10 that project through the travel opening 62.

In the exemplary embodiment according to FIG. 4, the tool spindle 32 can be moved along two translatory axes 92, 96 within the travel opening 62 along the opening area 60. This is accomplished by the linear drives 50, 52 (see FIG. 1). The axis 92 is parallel to the X-axis. The axis 96 is parallel to the Z-axis. The protective bellows 58 is sufficiently elastic to follow the required travel paths along the two axes 92, 96. In this way, covering of the travel opening 62 can be accomplished with only one protective bellows 58, although movement in two (or more) axes 92, 96 can take place.

The protective bellows 58 is designed as a cloth bellows or fabric bellows, for example. The cloth or fabric is based on a synthetic fiber, for example. In exemplary embodiments, a coating is provided on at least one side. In exemplary embodiments, the protective bellows 58 is present in the unmounted state as a sheet-like structure. The protective bellows 58 shown in a flat orientation in FIG. 4 has a mounting edge 106 in which a fold 108 is provided in the fabric. The fold 108 is secured by a seam, for example. This results in a circumferential guide for a tension member 110. The tension member 110 is designed, for example, as a tension band 112. In the exemplary embodiment, the tension member 110 is guided out of the mounting edge 106 at an opening 114. Thus, the tension member 110 can be tensioned to secure the protective bellows 58 to the mounting collar 64. It is understood that the protective bellows 58 may have a shape that differs from the flat representation in FIG. 4 when mounted.

Figure 5:
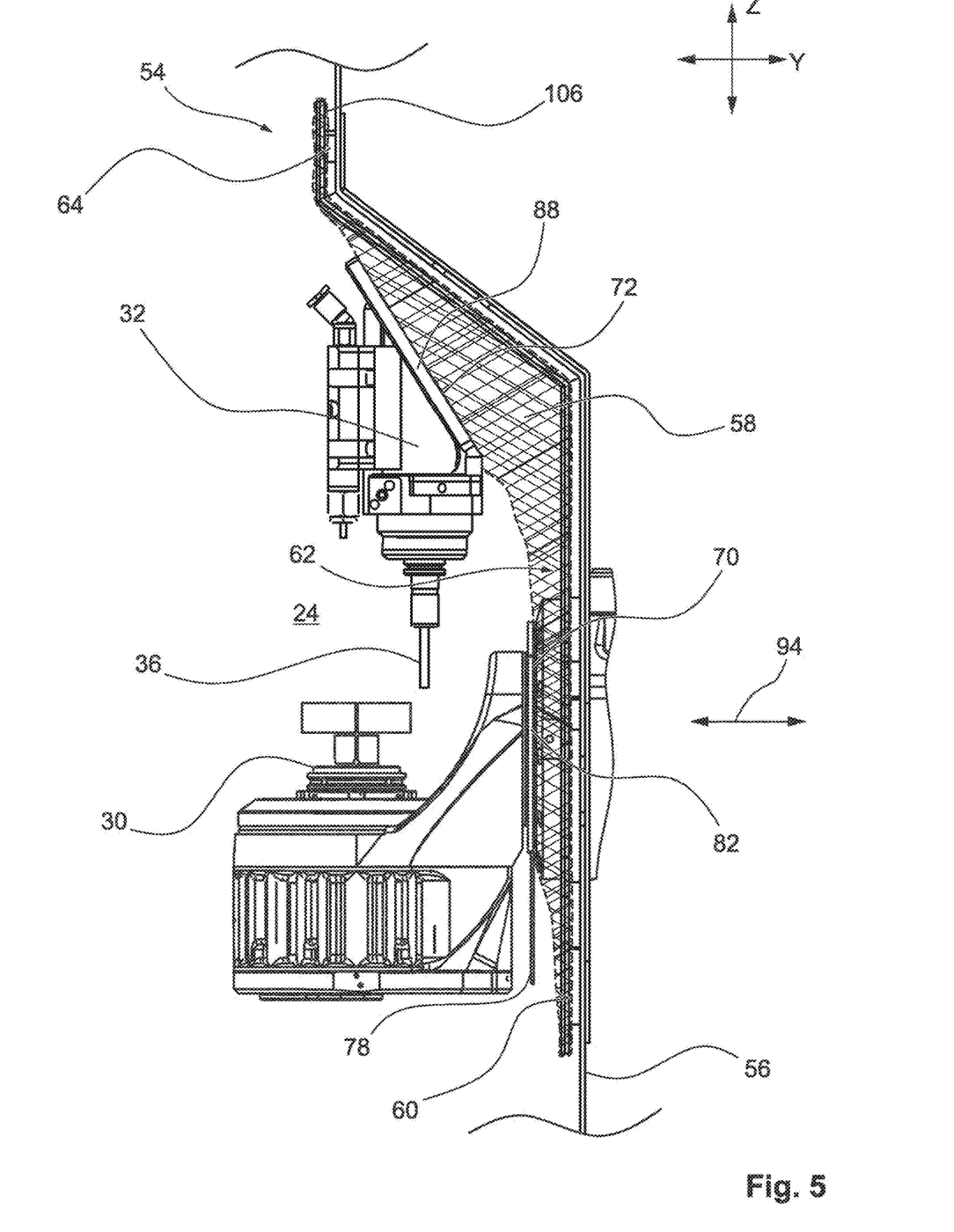
FIG. 5: is a partial side view based on the arrangement shown in FIG. 2.

FIG. 5 illustrates the shape of the protective cover 54 in the assembled state of the protective bellows 58 by means of a lateral view of the working space 24. As already explained above, the partition wall 56 with the travel opening 62 and the circumferential mounting collar 64 is not completely flat in the exemplary embodiment. The workpiece holder 30 and the tool spindle 32 are arranged at least partially in the working space 24. The workpiece holder 30 and the tool spindle 32 protrude through the protective bellows 58. Compare the clamping segment 82 for the workpiece holder 30 and the clamping segment 88 for the tool spindle 32. In FIG. 5, the clamping segments 82, 88 are offset from the opening area 60 of the travel opening 62 towards the working space 24. In FIG. 5, the opening area 60 is oriented perpendicular to the plane of view. In the configuration shown, the protective bellows 58 is curved or bulged, at least partially, in particular to bridge any offset between the workpiece opening 70, the tool opening 72 and the opening area 60 of the travel opening 62.

FIG. 5 also illustrates, using an axis designated by 94, that in the exemplary embodiment the workpiece holder 30 can be moved in translation by a linear drive 46 (see FIG. 1). The axis 94 is parallel to the Y-axis. Consequently, the workpiece holder 30 can be retracted or extended along the axis 94 in relation to the working space 24. This results in a change in a curvature of the protective bellows 58 in the vicinity of the workpiece opening 70 (see FIG. 4). The openings 70, 72 in the protective bellows 58 move relative to the mounting collar 64 or to the edge 66 of the partition wall 56 when the tool spindle 32 or the workpiece holder 30 are moved along the axes 92, 94, 96 assigned to them, e.g., when they are moved translationally along at least one of the axes 92, 94, 96 (X, Y, Z).

Figure 6:
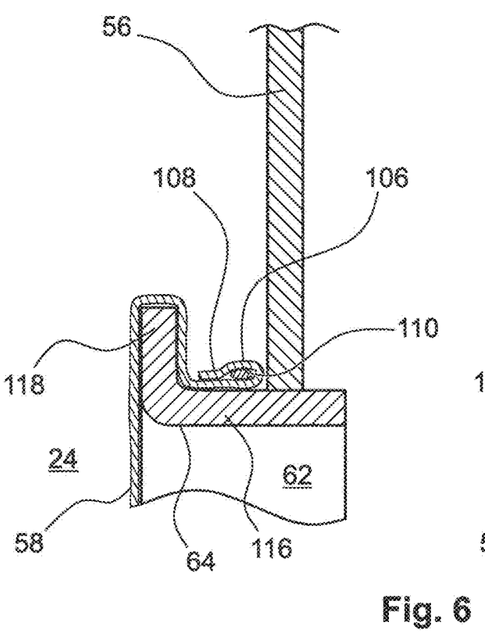
FIG. 6: is a lateral, cross-sectional partial view of a mounting collar with protective bellows mounted thereto.
Figure 7:
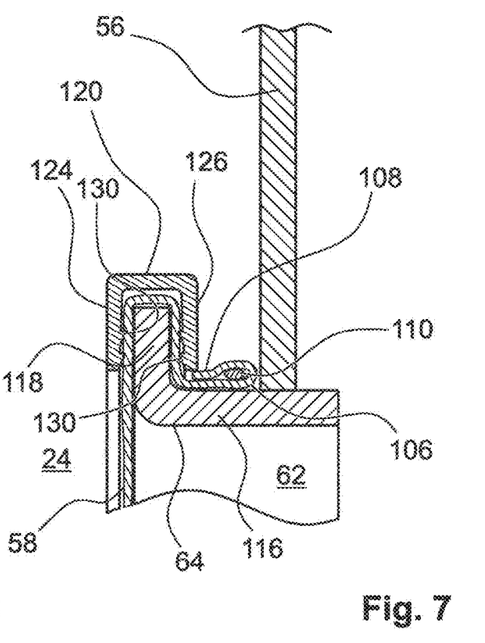
FIG. 7: is a further lateral, cross-sectional partial view of a mounting collar with protective bellows mounted thereto.
Figure 8:
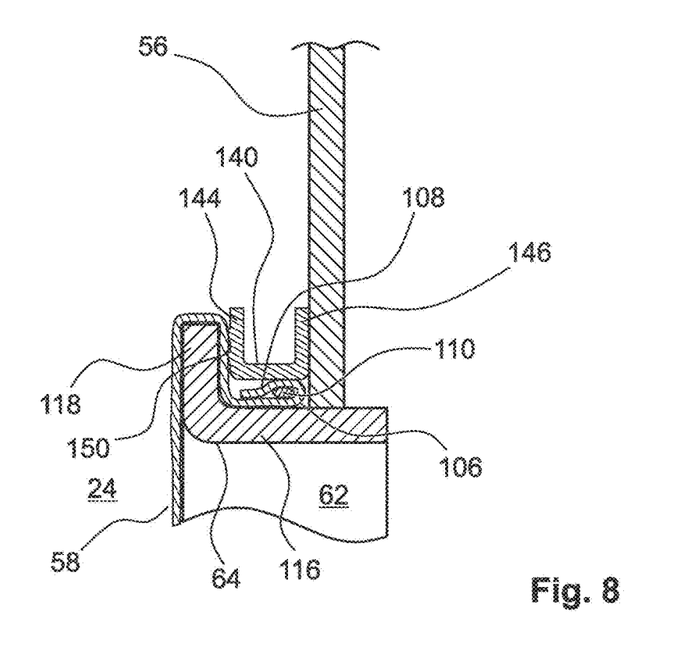
FIG. 8: is a further lateral, cross-sectional partial view of a mounting collar with protective bellows mounted thereto.

FIG. 5 illustrates that the mounting collar 64 is offset relative to the partition wall 56 towards the working space 24. The mounting edge 106 of the protective bellows 58 is secured to the mounting collar 64. FIGS. 6, 7 and 8 illustrate various detailed designs of this fastening, in each case showing cross-sectional detailed views of the mounting collar 64 with the protective bellows 58 mounted.

FIG. 6 shows that the mounting collar 64 has a base 116 and a front leg 118. The base 116 is oriented approximately perpendicular to the partition wall 56. The mounting collar 64 is attached to the partition wall, for example via the base 116. A front leg 118 adjoins the base 116 towards the working space 24. The front leg 118 is offset with respect to the partition wall 56 towards the working space 24. The front leg 118 increases the circumference of the mounting collar 64.

The protective bellows 58 closes the travel opening 62. In its edge area, the protective bellows 58 rests against the front leg 118, wherein the mounting edge 106 with the fold 108 rests against the base 118 in the exemplary embodiment according to FIG. 6. The tension member 110 is arranged in the fold 108. When the tension member 110 is tightened, the protective bellows 58 is secured to the mounting collar 64. The protective bellows 58 is slipped over the mounting collar 64. The protective bellows 58 can be lashed to the mounting collar 64.

FIG. 7 shows that the protective bellows 58 can additionally be secured to the mounting collar 64 via a clamping profile 120. In the exemplary embodiment, the clamping profile 120 is approximately U-shaped and is provided with two legs 124, 126. The clamping profile 120 can be slipped onto the front leg 118 and thus secures the protective bellows 58 to the front leg 118. By way of example, the clamping profile 120 has securing elements 130, which are designed as projections or barbs, for example. In this way, the clamping profile 120 can act on the (sufficiently soft) protective bellows 58 in order to additionally fix it to the mounting collar 64 in the area of the front leg 118. In this way, undesirable shearing movements can be reduced. This can lead to reduced wear and increased service life. Designs of the clamping profile 120 without securing elements 130 are conceivable.

FIG. 8 illustrates a modified design of a clamping profile 140, which can be used to additionally secure the protective bellows 58 to the mounting collar 64. The clamping profile 140 is U-shaped. In FIG. 8, the base of the clamping profile 140 faces the ground 116. A first leg 144 of the clamping profile 140 is supported on the front leg 118. A second leg 146 is supported on the partition wall 56. By way of example, the leg 144 is provided with securing elements 150, for example with projections, lugs or the like, which can act there on the (sufficiently soft) protective bellows 58. In this way, the protective bellows 58 can also be additionally secured to the mounting collar 64. Configurations of the clamping profile 140 without securing elements 150 are conceivable.

The invention claimed is:

1. A machine tool for multi-axis machining, comprising:
   a frame,
   a working space,
   a tool spindle with a tool holder arranged in the working space,
   a workpiece holder arranged in the working space,
   a partition wall comprising a travel opening and, adjacent to the travel opening, a mounting collar at least partially surrounding the travel opening, and
   a protective bellows,
   wherein the tool spindle and the workpiece holder are movable relative to one another in at least two translatory axes in the working space,
   wherein the partition wall delimits the working space,
   wherein at least one of the tool spindle and the workpiece holder is connected to the frame through the travel opening,
   wherein the protective bellows has a mounting edge that is adapted to the mounting collar,
   wherein the mounting edge is provided with a tension member, and
   wherein the protective bellows is mountable on the mounting collar in a relaxed state of the tension member and is secured on the mounting collar in a tensioned state of the tension member when in a mounted state.

2. The machine tool of claim 1,
   wherein the travel opening has an edge that is curved in three dimensions.

3. The machine tool of claim 1,
   wherein the travel opening defines a three-dimensionally extending opening area.

4. The machine tool of claim 1,
   wherein the protective bellows is a fabric bellows.

5. The machine tool of claim 4,
   wherein the protective bellows comprises a liquid-repellent and sealing impregnation or coating.

6. The machine tool of claim 1, further comprising:
   a clamping profile that secures the protective bellows to the mounting collar.

7. The machine tool of claim 1,
   wherein the mounting collar has a base which is adjoined, at least partially, by a front leg, and wherein the front leg is offset from the travel opening and serves as a positive positional locking means when the tension member is tensioned in the mounted state of the protective bellows.

8. The machine tool of claim 7, further comprising:
a clamping profile that urges the protective bellows against the mounting collar.

9. The machine tool of claim 8,
wherein the clamping profile is supported on the front leg.

10. The machine tool of claim 9,
wherein the clamping profile has two legs that enclose the front leg of the mounting collar therebetween.

11. The machine tool of claim 8,
wherein the clamping profile is supported between the front leg of the mounting collar and the partition wall.

12. The machine tool of claim 1,
wherein the tool spindle is connected to the frame through the travel opening and movable in translation with respect to the frame.

13. The machine tool of claim 1,
wherein the workpiece holder is connected to the frame through the travel opening and movable in translation with respect to the frame.

14. The machine tool of claim 1,
wherein the protective bellows is annular or octagonal in shape,
wherein the mounting edge encircles the protective bellows, and
wherein the tension member extends along the mounting edge of the protective bellows.

15. The machine tool of claim 1,
wherein the protective bellows has a tool opening for the tool spindle.

16. The machine tool of claim 15,
wherein the protective bellows has a plurality of fastening openings adjacent to the tool opening, and
wherein fastening elements project through the fastening openings in order to clamp the protective bellows adjacent to the tool opening.

17. The machine tool of claim 1,
wherein the protective bellows has a workpiece opening for the workpiece holder.

18. The machine tool of claim 17,
wherein the protective bellows has a plurality of fastening openings adjacent to the workpiece opening, and
wherein fastening elements project through the fastening openings in order to clamp the protective bellows adjacent to the workpiece opening.

19. The machine tool of claim 1,
wherein the protective bellows has at least one auxiliary opening.

20. The machine tool of claim 1,
wherein the protective bellows is made from an elastic fabric.

21. The machine tool of claim 20,
where the fabric is a polymer-based fabric that is coated on at least one side.

22. The machine tool of claim 1,
wherein prior to the mounting on the mounting collar the protective bellows is substantially a sheet structure,
wherein the mounting edge surrounds an inner region of the sheet structure, and
wherein at least one of a tool opening and a workpiece opening is arranged in the inner region of the sheet structure.

23. The machine tool of claim 1, further comprising:
a shield in the working space that is adjacent to the workpiece opening,
wherein the shield is arranged to be moved together with the workpiece holder along at least one translatory axis, and
wherein the shield is arranged as additional chip protection between the workpiece holder and the protective bellows.

24. The machine tool of claim 1,
wherein the tension member is a tension band that secures the protective bellows to the mounting collar.

* * * * *